United States Patent [19]

Finelli

[11] 3,816,226

[45] June 11, 1974

[54] FIRE PROTECTION MATERIAL
[75] Inventor: Thomas M. Finelli, North Andover, Mass.
[73] Assignee: Avco Corporation, Cincinnati, Ohio
[22] Filed: Mar. 31, 1972
[21] Appl. No.: 240,102

[52] U.S. Cl.............. 161/48, 117/136, 156/92, 156/278, 161/151, 161/159, 161/170, 161/403, 161/DIG. 4
[51] Int. Cl.............................................. B32b 3/06
[58] Field of Search............... 161/51, 53, 403, 410; 106/15 FP; 52/232; 117/136, 137, 140

[56] References Cited
UNITED STATES PATENTS
| | | | |
|---|---|---|---|
| 2,912,392 | 11/1959 | Stilbert et al. | 260/17.4 |
| 3,050,427 | 8/1962 | Slayter et al. | 156/26 |
| 3,320,087 | 5/1967 | Erickson | 117/137 |

FOREIGN PATENTS OR APPLICATIONS
| | | | |
|---|---|---|---|
| 821,990 | 9/1969 | Canada | 161/403 |
| 1,203,461 | 8/1970 | Great Britain | 161/403 |

Primary Examiner—George F. Lesmes
Assistant Examiner—James J. Bell
Attorney, Agent, or Firm—Charles M. Hogan, Esq.; Abraham Ogman, Esq.

[57] ABSTRACT

The invention is directed to a composite laminate material for physically isolating a protected surface from a fire. Fire resistance in the form of ablation and/or fire retardation may be incorporated. One layer of the composite is compressed and expands to its normal configuration when heated. An intumescent coating is applied to the exterior of the compressed layer. The intumescent coating also expands when heated. A protected surface is protected by the expanded thickness of both layers of the composite.

8 Claims, 2 Drawing Figures

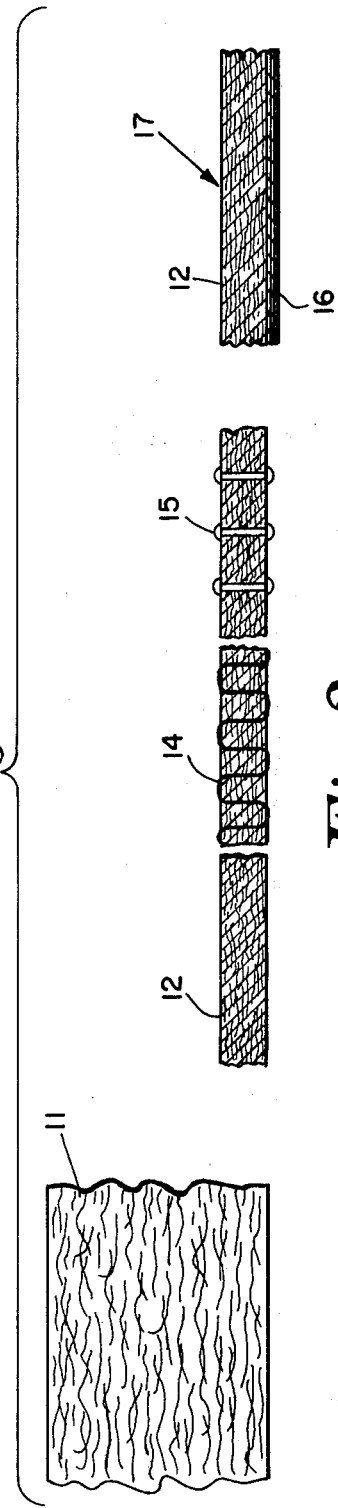
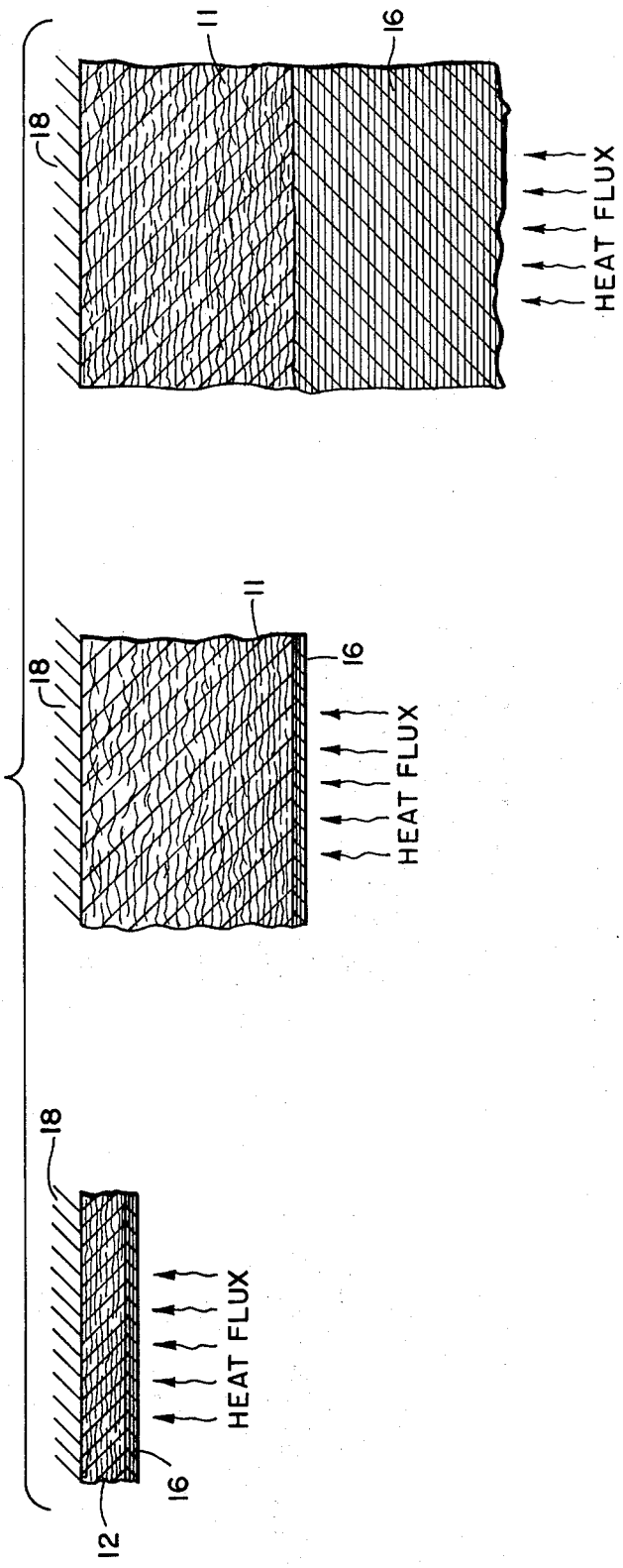

FIRE PROTECTION MATERIAL

Protection against fire is accomplished in a number of ways, most commonly by insulation and/or fire retardants. In recent years material which protects by decomposing and absorbing large quantities of heat at relatively low temperatures, a procedure known as ablation, has come into vogue.

The invention described herein protects primarily by insulation and secondly by ablation. Retardants may also be used.

It is an object of the invention to provide a fire protection material which:

1. avoids the limitations and disadvantages of known insulators;
2. presents a small profile when dormant but expands greatly when heated to separate a protected surface from a fire;
3. is a compressed material which is held in compression until heated and allowed to expand and an overlay of an intumescent material on the surface of the compressed material;
4. is primarily an insulator but may be constructed to act as an ablator and a retardant; and
5. comprises a compressed and expandable felt or cellular material having an intumescent coating on the exterior surface thereof.

The invention comprises a normally expanded material which is compressed and held in compression by a restraining means. The restraining means becomes inoperative at a predetermined temperature to allow the compressed material to expand to its normal expanded thickness. An intumescent coating is placed on the exterior surface of the compressed material. At a predetermined temperature the intumescent coating also expands. The combined effect is to provide a larger than normal separation between the protected surface and the fire.

As the preferred restraining means is a resin bond, fire protection via ablation, ablation occurs when the resin absorbs heat to melt and decompose.

Fire retardants may also be used in combination with a resin or imbedded in the compressed material.

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawings, in which:

FIG. 1 shows the steps in constructing the fire retarding material embodying the present invention; and FIG. 2 illustrates how the invention material performs in the presence of a fire.

Referring to FIG. 1, there is shown an expanded material 11. The material 11 may be felt-like material, such as fiberglass batts or a compressible foam, or, a cellular structure, such as honeycomb.

Preferably, the material 11 is formed from a fire retardant material such as fiberglass or mineral wool. In the alternative, the material 11 may be formed from an organic substance which will thermally decompose yielding a stable char.

To enhance the insulating properties of material 11, it should be highly porous and made from a substance that will not readily conduct heat. For purposes of this discussion, the material 11 will be presumed to be a fiberglass felt material 11.

The fiberglass felt material 11 is preferably impregnated with a thermoplastic resin or a resin which can be decomposed at a relatively low temperature, about 200°–400°F. After impregnation, the felt fiberglass 11 is compressed to a fraction of its normal expanded thickness as illustrated at 12. The resin is cured to a solid form and thereby restrains the compressed configuration 12 from expanding.

In the alternative, the compressed material 12 may be restrained against expanding by mechanical means, such as by the threads 14, or rivets 15. It is to be emphasized that the threads on rivets are formed from a material which will cause them to loose their restraining capability at a relatively low temperature of about 200°–400°F.

After the compressed material 12 is restrained against expansion, a coating of intumescent material 16 is applied to one or both of the exterior surfaces. The intumescent coating 16 is applied directly to the compressed material 12 and may penetrate into each pore of the compressed material 12 as are available.

The combination of restrained compressed material 12 and the intumescent coating 16 comprises a composite fire protection material 17.

An application of the fire protection composite 17 and the manner in which it functions to protect a surface 18 is illustrated in FIG. 2. An application for the fire protecting composite 17 for sealing an air duct is described in the co-pending U.S. Pat. application, Ser. No. 240,176, filed on the same day as this application was filed, and has a common Assignee.

Referring to FIG. 2, there is illustrated a protected surface 18 which is covered by the fire protecting composite 17. The composite 17 is preferably bonded to the protected surface 18, although mechanical fastenings may be used. A fire is schematically illustrated by the arrows entitled "heat flux" in FIG. 2.

The heat flux heats the composite 17. At a predetermined softening and/or decomposing temperature, the resin in the compressed material 12 softens and loses its restraining capability. The compressed material 12 reverts to its normally expanded configuration 11.

As the fire continues to heat the composite 17, the intumescent coating reaches its expansion temperature. This will generally be higher than the temperature at which the restraints are removed by the resin. In a typical fashion, the intumescent coating intumesces and expands several orders of magnitude, producing a stable char which insulates the surface to be protected further from the fire.

By way of example, 4 inch fiberglass insulation may be compressed to about one-fourth of an inch. A 10 mil intumescent coating expands 2 to 3 orders of magnitude with 100 – 150 times being common.

It therefore follows that a one-fourth inch of protection on a surface will separate that surface from a fire from 7–9 inches. In contrast, an intumescent alone effects a separation of 3–5 inches.

Since the transfer of heat flux through an insulation varies significantly with the distance separating the fire from the surface to be protected, the insulating effect of each additional inch of separation is quite impressive.

Further, if the composite is used to close an opening, the composite, with illustrated parameters, can close an opening having four times the area that can be closed by the intumescent alone.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims:

I claim:

1. A fire protecting composite material comprising:

a compressible material selected from an ablative felt or a cellular material which has been compressed to a fraction of its normal thickness, said compressed material being restrained against expansion by a restraining means comprising a mechanical fastener or a resin impregnant, said restraining means being adaptable to release its restraint at a predetermined temperature to permit the compressible material to expand to its normal thickness; and an intumescent coating on at least one surface of said compressed material.

2. A fire protecting composite material as described in claim 1, wherein said compressible material is a nonwoven felt.

3. A fire protecting composite material as described in claim 1, wherein said restraining means is a resin bond.

4. A fire protecting composite material as described in claim 1, wherein said restraining means and/or said compressed material is an ablator.

5. A fire protecting composite material as described in claim 1, wherein said restraining means is a mechanical fastener.

6. A fire protecting composite material as described in claim 1, wherein said composite includes, in addition, fire retardants.

7. A fire protecting composite material as described in claim 1, wherein said compressed material is a fiberglass felt.

8. A fire protecting composite material as described in claim 1, wherein said compressed material is a cellular material.

* * * * *